(12) United States Patent
Poindexter et al.

(10) Patent No.: US 7,667,641 B1
(45) Date of Patent: *Feb. 23, 2010

(54) PORTABLE NAVIGATIONAL DEVICE WITH A REMOTE CONTROL, AN INTERNAL MEMORY, AND INTERNAL HEATING ELEMENT

(75) Inventors: Brian N. Poindexter, Gardner, KS (US); Scott J. Brunk, Overland Park, KS (US); Seth A. Forshee, Olathe, KS (US)

(73) Assignee: Garmin Ltd. (KY)

( * ) Notice: Subject to any disclaimer, the term of this patent is extended or adjusted under 35 U.S.C. 154(b) by 246 days.

This patent is subject to a terminal disclaimer.

(21) Appl. No.: 11/696,525

(22) Filed: Apr. 4, 2007

Related U.S. Application Data

(63) Continuation of application No. 10/859,005, filed on Jun. 2, 2004, now Pat. No. 7,215,279.

(51) Int. Cl.
G01S 1/02 (2006.01)
G01C 21/00 (2006.01)
(52) U.S. Cl. .............................. 342/357.06; 342/357.13; 701/213
(58) Field of Classification Search ............ 342/357.06, 342/357.12, 357.13, 419; 701/207, 213, 701/215

See application file for complete search history.

(56) References Cited

U.S. PATENT DOCUMENTS

| | | | |
|---|---|---|---|
| 5,640,646 A | 6/1997 | Toyohara et al. ............... 399/69 |
| 6,094,618 A | 7/2000 | Harada ......................... 701/207 |
| 6,574,556 B2 | 6/2003 | Fish et al. .................... 701/213 |
| 6,705,778 B2 | 3/2004 | Yoshida et al. ............... 396/572 |
| 6,742,144 B2 * | 5/2004 | Co ............................... 714/42 |
| 6,768,450 B1 | 7/2004 | Walters et al. .......... 342/357.09 |
| 6,795,770 B1 | 9/2004 | Hanshew et al. ............. 701/213 |
| 7,440,845 B1 * | 10/2008 | Laverick et al. ............. 701/200 |
| 2004/0098536 A1 | 5/2004 | Sundareson et al. ......... 711/112 |
| 2004/0212653 A1 | 10/2004 | Hetzer et al. .................. 347/19 |
| 2005/0177252 A1 | 8/2005 | Chernoff et al. .............. 700/17 |
| 2005/0190707 A1 | 9/2005 | Nishizawa et al. .......... 370/286 |

* cited by examiner

*Primary Examiner*—Dao L Phan
(74) *Attorney, Agent, or Firm*—Samuel M. Korte

(57) ABSTRACT

A navigation system (10) comprising a portable navigational device (12) and a remote control for remotely controlling the navigational device (12) is provided in a first preferred embodiment. The navigational device (12) is sized and configured to mount on a dashboard or in an overhead console of a vehicle. A second preferred embodiment provides a navigational device (212) substantially similar to the navigational device (12) of the first preferred embodiment and further including an internal hard drive (84) and a heating element (86) associated with the hard drive (84) and operable to warm the hard drive (84) for facilitating operating performance of the hard drive (84) in cold temperatures. A third preferred embodiment provides a navigation system (310) including a navigational device (312) substantially similar to the navigational device (212) of the second preferred embodiment and a remote control (314) substantially similar to the remote control (14) of the first preferred embodiment.

11 Claims, 5 Drawing Sheets

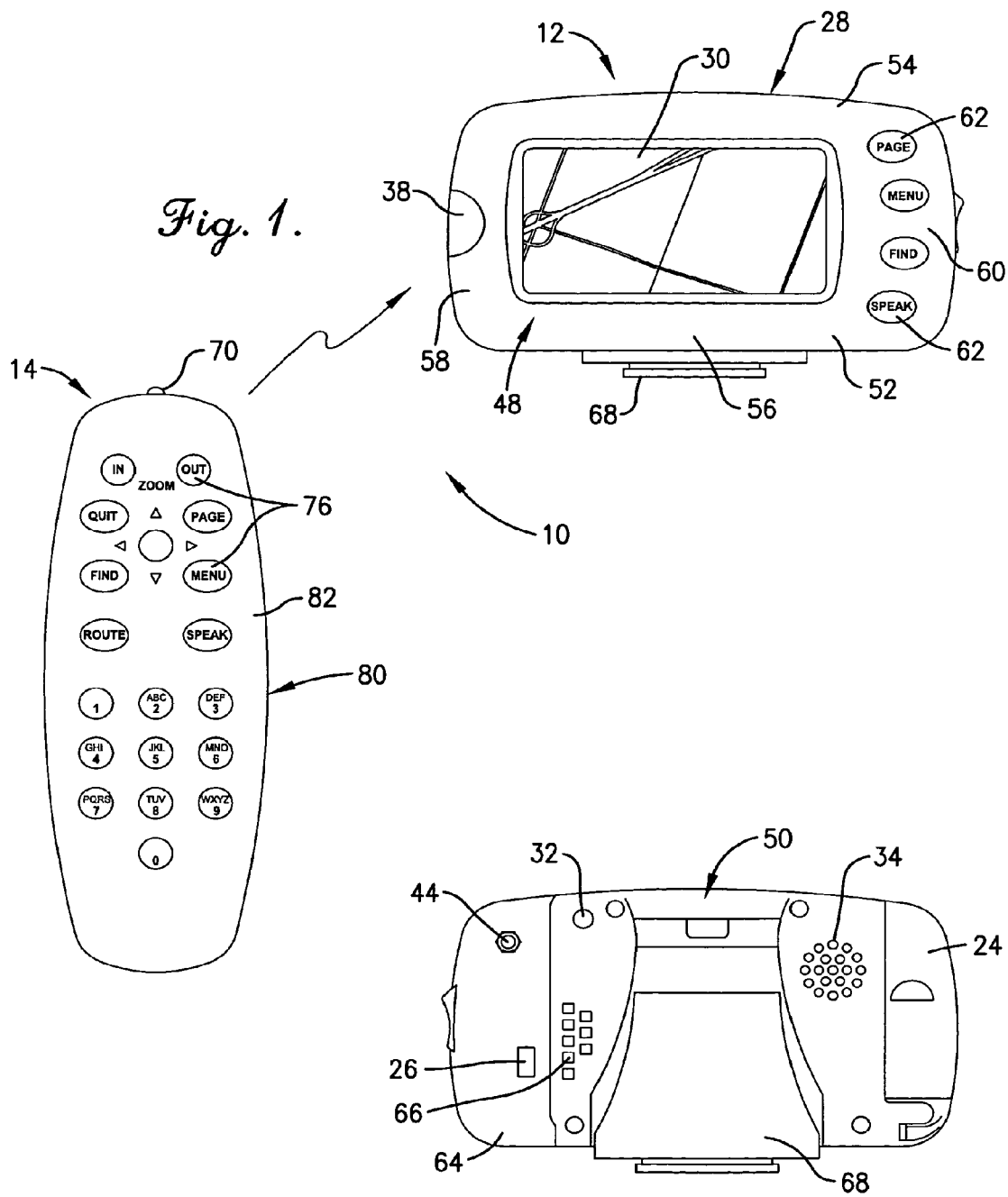

PORTABLE NAVIGATIONAL DEVICE WITH A REMOTE CONTROL, AN INTERNAL MEMORY, AND INTERNAL HEATING ELEMENT

RELATED APPLICATIONS

The present application is a continuation of and claims priority benefit of co-pending, commonly assigned U.S. patent application entitled "PORTABLE NAVIGATIONAL DEVICE WITH REMOTE CONTROL, AN INTERNAL MEMORY, AND AN INTERNAL HEATING ELEMENT", Ser. No. 10/859,005, filed Jun. 2, 2004, the specification of which is incorporated herein by specific reference.

BACKGROUND OF THE INVENTION

1. Field of the Invention

The present invention relates to portable electronic devices. More particularly, the invention relates to a navigation system comprising a portable navigational device and a remote control operable to remotely control the navigational device. One embodiment of the navigational device includes an internal hard drive for storing cartographic data or other navigation-related data and a heating element associated with the hard drive and operable to warm the hard drive for improving its performance.

2. Description of the Prior Art

Portable navigational devices for use in vehicles are well known. Such a navigational device may be mounted on a vehicle dashboard or in an overhead console. The navigational device is operable to provide navigation instructions to a user, both audibly using a speaker or visually using a display mounted on a front of the navigational device. The navigational device often includes a plurality of control buttons mounted on the device for controlling and instructing the navigational device. Alternatively, the display of the navigational device is a touch screen display operable to control the navigational device.

The navigational device is frequently used by a driver of the vehicle while in route to a location. As such, the driver is operating the vehicle while also controlling and instructing the navigational device. As can be appreciated, control of the navigational device, just as with control of a mobile telephone or other similarly distracting device, can be dangerous if not carefully used during operation of the vehicle.

Placement of the navigational device within the vehicle is usually for the benefit and use of the driver and is without regard to use by passengers of the vehicle. As such, the navigational device is often put within the driver's reach and thus, is difficult to reach by the passenger, especially if the passenger is in a backseat of the vehicle. Even if the passenger is in a front seat of the vehicle, the passenger may be restrained from reaching towards the middle of the vehicle and towards the dashboard or overhead console by a seat belt. Therefore, use of the navigational device while driving is often minimized due to the difficulty in operating the navigational device while the vehicle is moving. Unfortunately, the navigational device is often most needed while driving, such as when using the navigational device for driving directions.

Accordingly, there is a need for an improved navigational device that overcomes the limitations of the prior art. More particularly, there is a need for a navigation system comprising a navigational device and a remote control for remotely controlling the navigational device. The remote controlled navigational device may then be used in small or restricted quarters, such as in a vehicle, where manual control of the navigational device is difficult or unsafe.

Portable navigational devices also often include internal memory and/or a memory slot for receiving a memory cartridge having cartographic data stored thereon. The internal memory can only store a small amount of cartographic data, and the memory cartridge is commonly preprogrammed with cartographic data for a certain region or use. However, because the amount of possible cartographic data for use with a navigational device can be extremely large, prior art navigational devices do not contain sufficient memory for storing all cartographic data stored thereon. Consequently, users of the navigational devices are required to buy additional memory cartridges having the preprogrammed cartographic data stored thereon or, alternatively, program the memory or memory cartridge with new data.

To remedy the problems of limited storage capacity, some navigational devices now include internal hard drives operable to store a much larger amount of cartographic data. Unfortunately, operation of the hard drives is often slowed by the temperature conditions where the navigational devices are commonly used. For example, navigational devices are often used in outdoor activities where the weather is cold. As is well known, the performance of the hard drives is affected by the cold temperatures, thus causing the hard drives to operate slowly and inefficiently.

Accordingly, there is a need for an improved navigational device that overcomes the limitations of the prior art. More particularly, there is a need for a navigational device having an internal hard drive operable to perform quickly, even in cold temperatures.

SUMMARY OF THE INVENTION

The present invention solves the above-described problems and provides a distinct advance in the art of navigational systems. More particularly, a first embodiment of the present invention provides a navigation system comprising a navigational device and a remote control operable to remotely control the navigational device. The navigational device is preferably portable and sized and configured to be mounted on a dashboard or overhead console of the vehicle. The remote control is operable to transmit control signals to the navigational device via infrared light or other wireless technology.

A second preferred embodiment of the present invention is a navigational device substantially similar to the navigational device of the first preferred embodiment and further including an internal hard drive and a heating element associated with the hard drive and operable to warm the hard drive for improving its performance without adversely affecting nearby electronic components and circuitry. The heating element thus allows the hard drive to be operated in cold temperatures without damage to the hard drive.

A third preferred embodiment of the present invention is a navigation system including both a remote control as described in the first preferred embodiment of the invention and an internal hard drive and a heating element as described in the second preferred embodiment of the invention.

By constructing a navigation system and navigational device as described herein, numerous advantages are realized. For example, the navigation system of the first preferred embodiment allows a user to operate and control the navigational device without manually touching the device. Because the navigational device is often used in a vehicle, the user is limited in his or her movement within the vehicle. The remote control of the navigation system thus facilitates operation of the navigational device and prevents possibly unsafe driving behavior.

The second preferred embodiment allows for operation of the internal hard drive of the navigational device when ambient air around the hard drive is relatively cold, thus permitting the navigational device to be used outdoors in cold temperatures without sacrificing performance and speed.

The third preferred embodiment combines the features and advantages of the first and second embodiments.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein:

FIG. 1 is a front view of a navigation system constructed in accordance with a first preferred embodiment and illustrating a navigational device and a remote control for remotely controlling the navigational device;

FIG. 2 is a rear view of the navigational device of the first preferred embodiment;

Figure 3:
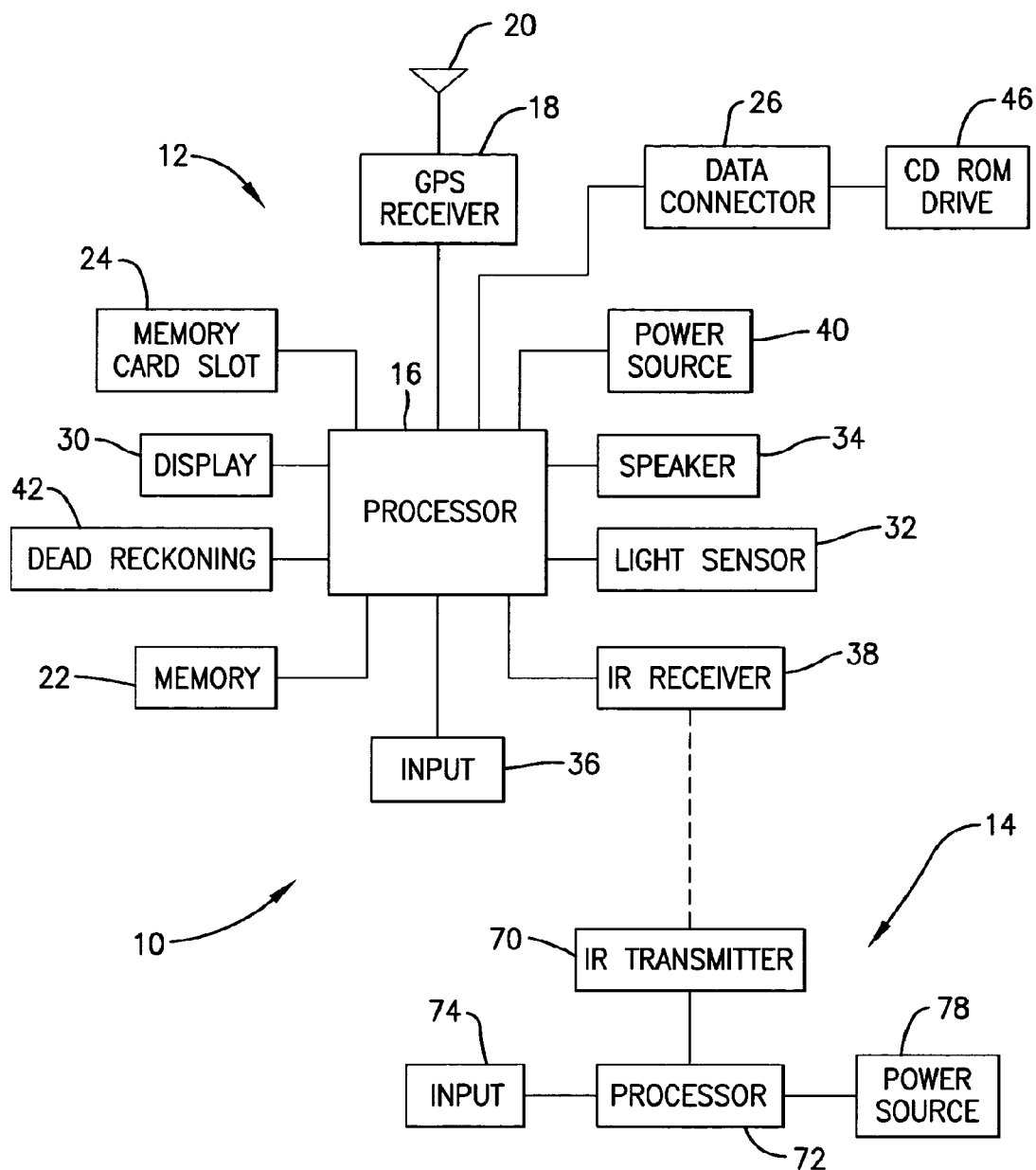
FIG. 3 is a block diagram of components of the navigation system of the first preferred embodiment.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Turning now to the drawing figures, and particularly FIGS. 1-3, a navigation system 10 constructed in accordance with a first preferred embodiment of the invention is illustrated. The navigation system 10 is preferably configured for use in a vehicle, such as an automobile, boat, etc., although it may be used in any location where a portable navigation system is desired. The navigation system 10 broadly comprises a portable navigational device 12 and a handheld remote control 14 for remotely operating the navigational device 12.

The navigational device 12 is preferably adapted to be mounted on a dashboard or in an overhead console of the vehicle. A driver, passenger, or other user in the vehicle may then operate the navigational device 12 without having to reach towards the dashboard or overhead console. Because the portable navigational device 12 is relatively small, operating the device 12 while driving or in confined spaces is difficult and unsafe. Additionally, operation of the navigational device 12 by a user in a backseat of the vehicle is generally impossible, without requiring the user to climb into a front area of the vehicle where the navigational device 12 is located. Therefore, the present invention provides for the navigation system 10 that allows the user to operate the portable navigational device 12 remotely, without requiring the user to be in actual physical contact with the device 12.

The navigational device 12 of the first preferred embodiment is preferably a portable navigational device that is operable to provide navigation information, such as a current location or position, instructions on proceeding towards a location or position, cartiographic information, etc. As noted above, the navigation system 10 of the first preferred embodiment is optimally sized and configured for use in the vehicle, and as such, the navigational device 12 is preferably sized and configured for mounting on the dashboard of the vehicle or in the overhead console. Alternatively, the navigational device 12 may be a portable, handheld device. Therefore, although the navigational device 12 is preferably portable, the exact size and dimensions of the navigational device 12 may vary depending on the use and placement of the navigational device 12.

The navigational device 12 is preferably a global positioning system ("GPS") device, such as the STREETPILOT 2620 or 2660, manufactured and sold by Garmin International, Inc. of Olathe, Kans. As illustrated in FIG. 3, the navigational device 12 preferably comprises a processor 16, a GPS receiver 18, an antenna 20, a memory 22, a memory card slot 24, a data connector 26, a housing 28, a display 30, a light sensor 32, a speaker 34, a plurality of inputs 36, an infrared receiver 38, an internal power source 40, and a dead reckoning system 42. The GPS receiver 18 is preferably electronically coupled with the processor 16 and is operable to receive satellite signals from a plurality of satellites using the antenna 20, such as a GPS patch antenna. Alternatively, the navigational device 12 may be coupled with an external antenna (not shown) of the vehicle via an external antenna connector 44, as illustrated in FIG. 2. The processor 16 is then operable to calculate a location or position of the navigational device 12 as a function of the satellite signals.

The memory 22 is preferably coupled with the processor 16 but may instead be coupled with a processor (not shown) of the automobile. Cartographic data, including related information for current or past traveling sessions of the user, is preferably stored on the memory 22 and is operable to be accessed by the processor 16. Alternatively, or in addition to the memory 22, the navigational device 12 includes the memory card slot 24 operable to receive a programmed memory card (not shown) having cartographic data stored thereon. An example memory card is sold under the trademark COMPACTFLASH. The processor 16 is then operable to upload cartographic data from the memory card. The navigational device 12 also includes the data connector 26, such as a USB connector. Cartographic data may then be uploaded from an external data source, such as a CD Rom drive 46, via the data connector 26.

The housing 28 is preferably sized and configured so as to be portable and handheld and to store the processor 16, the GPS receiver 18, the antenna 20, the memory 22, the memory card slot 24, and the internal power source 40. The housing 28 is preferably formed of plastic, fiberglass, or other suitable material and is preferably generally rectangular shaped, although the shape is dependent on the location of the navigational device 12 within the automobile. As illustrated in FIGS. 1 and 2, the housing 28 includes a front, frame-shaped section 48 and an attached rear, box-shaped section 50. The front section 48 includes a front face 52 and upper and lower walls 54,56 and left and right side walls 58,60 that together define an enclosed area for receiving the display 30. The housing 28 of the navigational device 12 is preferably approximately six inches wide, four inches high, and three inches deep, although the width may range between two inches and twelve inches, the height may range between two inches and twelve inches, and the depth may range between one inch and twelve inches. Additionally, the exact dimensions of the housing 28 may differ depending on the placement of the navigational device 12 within the vehicle.

The input 36, described in more detail below, preferably includes a plurality of control buttons 62 positioned on the front face 52 at the right side wall 60 of the housing 28, as illustrated in FIG. 1. The infrared receiver 38 is preferably positioned on the front face 52 at the left side wall 58. Operation of the infrared receiver 38 will be described below with respect to the remote control 14. The antenna 20, as described above, is preferably stored internally within the front section 48 of the housing 28.

The display 30 of the navigational device 12 is preferably a liquid crystal display capable of displaying multiple lines, including a plurality of alphanumeric characters, shapes, and symbols. For example, the display 30 may use large fonts and images for easy reference during operation of the navigational device 12, use small fonts and images to accommodate more information while the user is programming the device 12 or reviewing information, or use a combination of large and small fonts and images. Additionally, the display 30 is preferably viewable from multiple angles, such that multiple users may view the display 30 without rotating or moving the navigational device 12. The display 30 may also be backlit such that it may be viewed in the dark or other low-light environments. The light sensor 32, electronically coupled with the processor 16, accommodates viewing of the navigational device 12 in such environments by sensing an amount of ambient light so as to automatically adjust the display 30 according to the ambient light. The display 30 may be a touch screen display allowing for control of the processor 16 by touching the control buttons on the display 30.

The input 36 allows for control of the processor 16 using the control buttons 62. The control buttons 62 may be used to operate drop-down menus to select and input names or other identifiers. Alternatively, the input 36 may be an alphanumeric keypad (not shown), such as a telephone keypad, which may be used to type in names, identifiers, and text, or the input 36 may be the touch screen display 30.

As illustrated in FIG. 2, the rear, box-shaped section 50 is attached to the front section 48 and includes a rear face 64. The external antenna connector 44, light sensor 32, and data connector 26 are all positioned on the rear face 64 of the rear section 50. The rear section 50 also includes a power/speaker/dead reckoning connector 66 for coupling the navigational device 12 with an external power source, an external speaker, and/or the dead reckoning system 42. The rear section 50 also includes an adjustable mount 68 for positioning the navigational device 12 at a desired viewing angle.

The speaker 34 is preferably positioned on the rear face 64, although the speaker 34 may be positioned anywhere on the housing 28 or may be positioned within the vehicle, such as in a power adapter (not shown) of the vehicle. The speaker 34 is preferably electronically coupled with processor 16 of the navigational device 12, or alternatively, the speaker 34 is electronically coupled with a speaker (not shown) of the automobile. The speaker 34 is operable to provide audible navigation instructions or guidance to the user.

The rear section 50 also includes the internal power source 40, which is preferably at least one battery cell. The power source 40 is electronically coupled with the processor 16 and operable to power the navigational device 12. Alternatively, the navigational device 12 may be electronically coupled with the external power source, such as a power source of the vehicle (not shown). The dead reckoning system 42 of the navigational device 12 is operable to accounts for the vehicle's speed and turns to determine a route the vehicle has traveled. The dead reckoning system 42 may then be used if the GPS receiver 18 of the navigational device 12 is inoperable or otherwise inaccessible. The dead reckoning system 42 is preferably connected to the vehicle's speed sensor and reverse light signal. Internal rate sensors, such as sensors employing gyroscopes, detect vehicle turning motion. The dead reckoning system 42 is then able to determine when the vehicle turns and the speed of the vehicle. The dead reckoning system 42 may be electronically coupled with the navigational device 12 via the connector 66 on the rear section 50 of housing 28.

The remote control 14 of the navigation system 10 is preferably operable to wirelessly transmit instructions or control signals to the navigational device 12. In preferable form, the remote control transmits the instructions via an infrared transmitter 70, as illustrated in FIGS. 1 and 3. The infrared transmitter 70 is preferably a light emitting diode ("LED") operable to emit infrared light. Other types of wireless transmitters/transceivers may be used, such as transmitters employing wireless fidelity ("Wi-FI") technology or technology manufactured and sold under the trademark BLUETOOTH.

The remote control 14 preferably comprises the infrared transmitter 70 electronically coupled with a processor 72, an input 74 comprising a plurality of control buttons 76, a power source 78, such as at least one battery cell, and a housing 80. The processor 72 comprises conventional, well known electronic circuitry (not shown) that implements and controls the infrared signals transmitted by the infrared transmitter 70.

The housing 80 of the remote control 14 is preferably formed of plastic, fiberglass, or other suitable material and is preferably generally rectangular shaped, although the shape of the housing 80 may be dictated by aesthetic or ergonomic considerations. The housing 80 is preferably approximately three inches wide, seven inches high, and one inch deep, although the width may range between one inch and twelve inches, the height may range between one inch and twelve inches, and the depth may range between one-half inch and twelve inches.

As illustrated in FIG. 1, the plurality of controls buttons 76 are position on a front face 82 of the remote control 14 for operating the remote control 14. In particular, the remote control 14 includes control buttons 76 for zooming in/out, selecting route navigation features, instructing the navigational device 12 to speak a navigation instruction, and paging among main pages and displays. The control buttons 76 also include an alphanumeric keypad for entering address information. The control buttons 76 preferably allow operation of more than one function of the navigational device 12 using a single control button 76. Preferably, the navigational device 12 need not be instructed to receive instructions from either actuation of the control buttons 76 positioned on the remote control 14 or actuation of the control buttons 76 positioned on the housing 28 of the navigational device 12, but rather, the navigational device 12 preferably may receive instructions via the control buttons 62,76 on both the remote control 14 and the navigational device 12 independently or in conjunction with each other. This allows the user to, at one instance, control the navigational device 12 via the remote control 14, and at a second instance, control the navigational device 12 via the control buttons 62 on the navigational device 12 or via touching the display 30.

Upon actuation of the control buttons 76, the processor 72 of the remote control 14 is instructed to transmit infrared signals to the navigational device 12, as is well known in the art. The infrared receiver 38 of the navigational device 12 receives and transmits the signals to the processor 16 of the navigational device 12. The processor 16 then instructs or controls the memory 22, display 30, speaker 34, etc., as directed by the signals. Preferably, all operation of the navigational device 12 may be performed using the remote control 14. In some instances, operation of the remote control 14, instead of the control buttons 62 on the navigational device 12, may allow for faster or easier operation of the navigational device 12.

As noted above, the remote control 14 may be used to wirelessly control the portable navigational device 12 from a distance without having to physically touch or actuate the control buttons 62 of the navigational device 12. A maximum distance from which the remote control 14 may control the navigational device 12 is dependent on the strength of the infrared signals being transmitted by the remote control 14. Use of the remote control 14 is particularly advantageous when direct contact with the navigational device 12, due to the positioning of the navigational device 12, is difficult or impossible. Additionally, because users often will be able to memorize a location of the control buttons 76 on the remote control 14, use of the remote control 14 while driving is much safer than reaching out towards and actuating the control buttons 62 of the navigational device 12 mounted on the dashboard or in the overhead console of the vehicle.

In an alternative implementation, the remote control 14 may further include a memory (not shown) coupled with the processor 72 and operable to store cartographic data. The remote control 14 is then preferably operable to wirelessly receive the data from a data source, such as a computer, store the data in the remote control's memory, and wirelessly transfer the data, via the infrared transmitter 70, to the navigational device 12. This may be advantageous when the navigational device 12 is stored in the vehicle, and the user does not desire to remove the navigational device 12 from the vehicle for loading of cartographic data from the data source.

Figure 4:
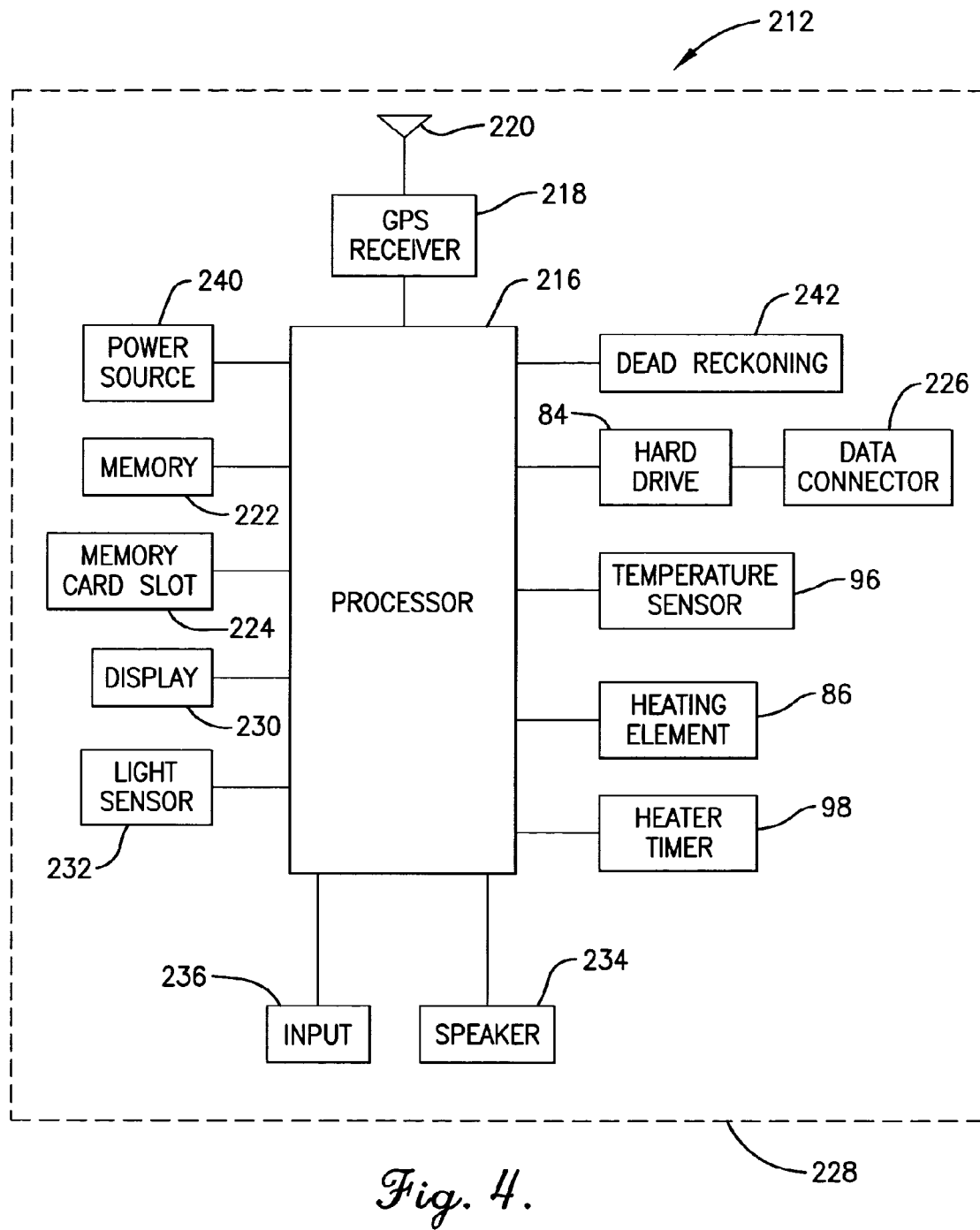
FIG. 4 is a block diagram of components of a navigational device of a second preferred embodiment.
Figure 5:
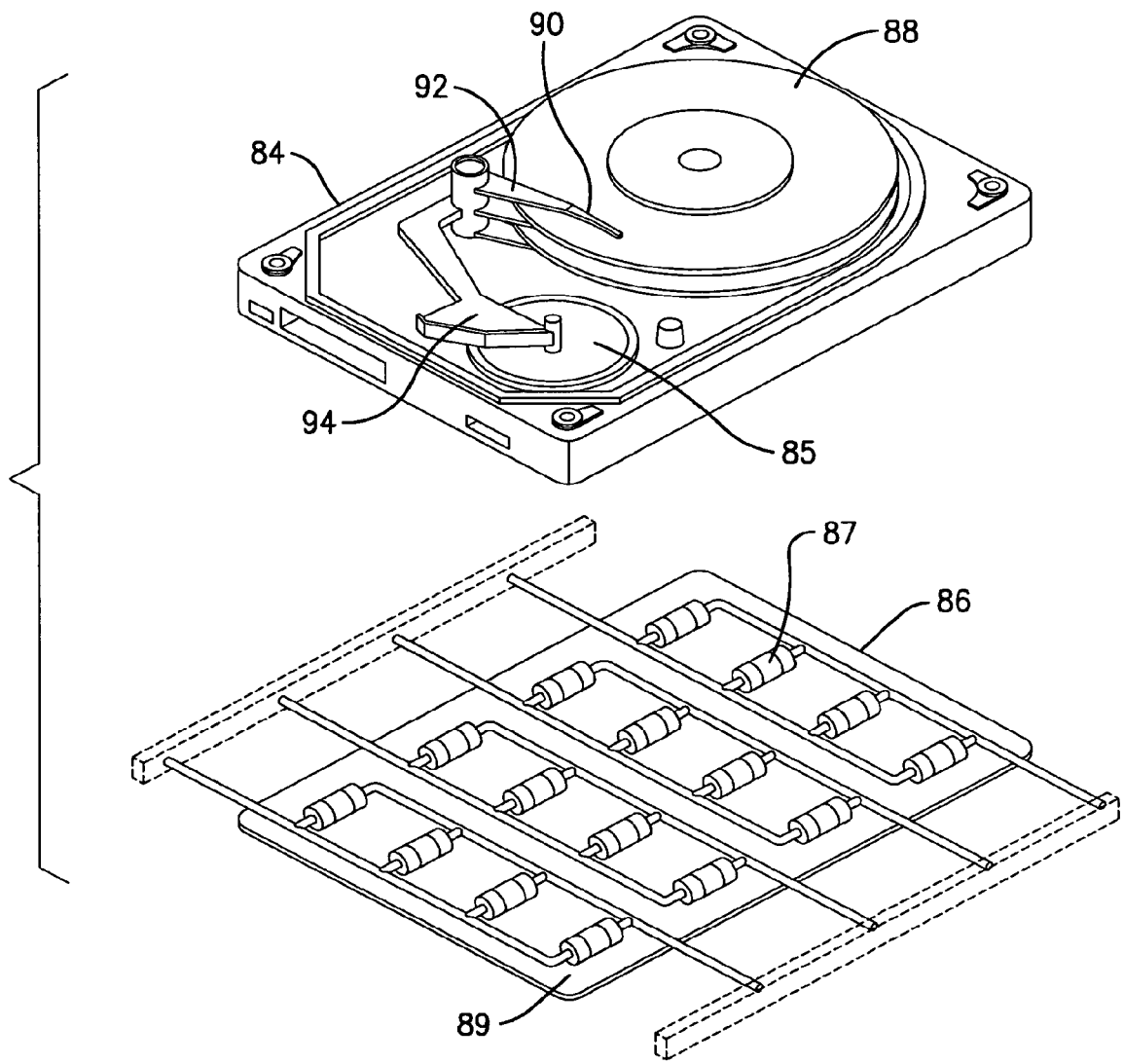
FIG. 5 is an exploded isometric view of a hard drive and a heating element of the navigational device of the second preferred embodiment.
Figure 6:
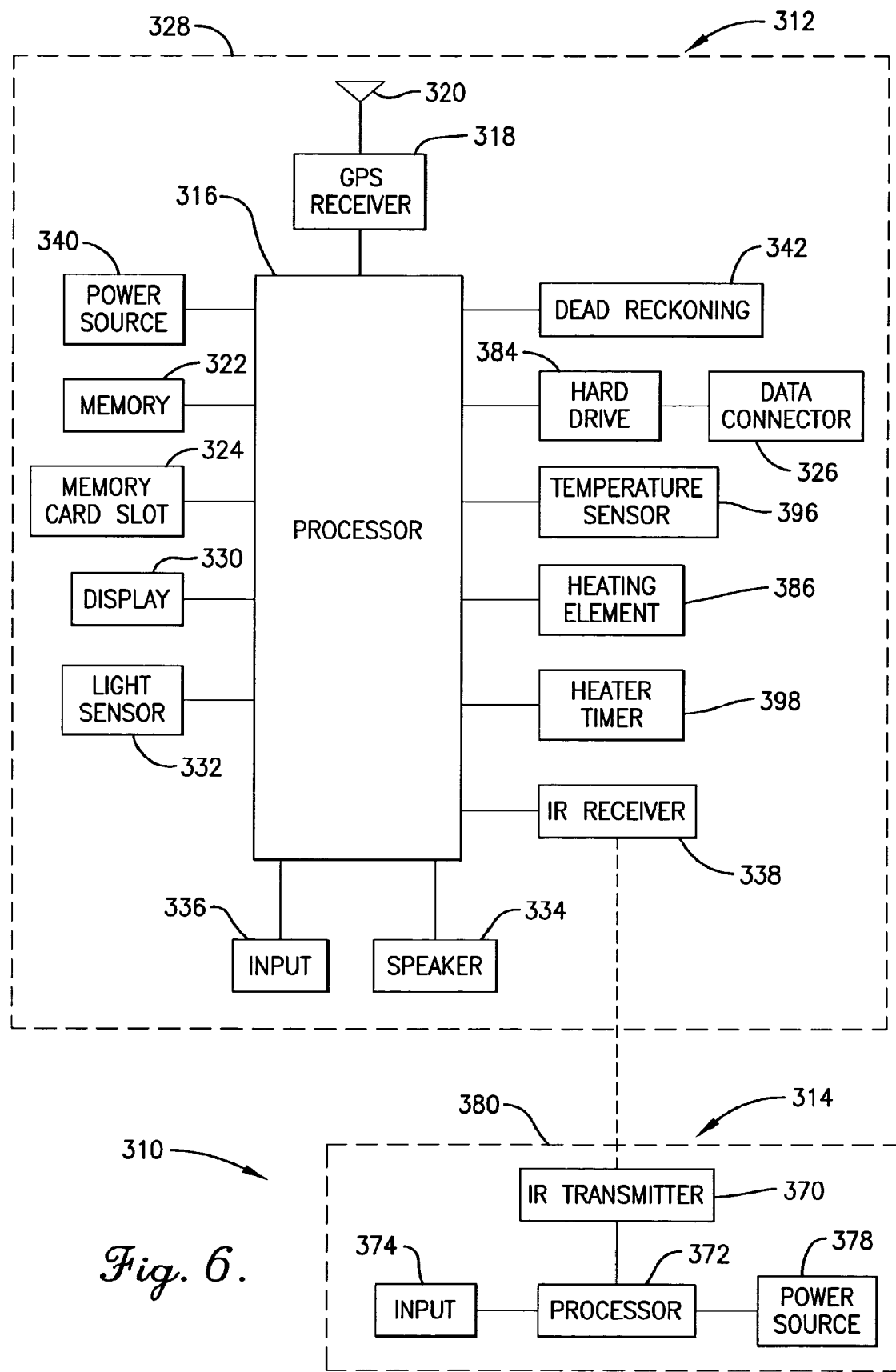
FIG. 6 is a block diagram of components of a navigation system of a third preferred embodiment.

As illustrated in FIGS. 4 and 5, a second preferred embodiment provides a navigational device 212 substantially similar to the navigational device 12 of the first preferred embodiment and further including an internal hard drive 84 and a heating element 86 associated with the hard drive 84. The hard drive 84 is operable to store cartographic data or other navigation-related data, as discussed in more detail below. The heating element 86 is positioned proximate to the hard drive 84 and is operable to warm the hard drive 84 for improving its performance without adversely affecting nearby electronic components and circuitry. Alternatively, the heating element 86 may be embedded within the hard drive 84 or may be positioned anywhere within the navigational device 212, such that the heating element 86 is generally associated with the hard drive 84 and is operable to warm the hard drive 84. Because the hard drive 84 is warmed, the hard drive 84 is operable to store and retrieve data without damage to the hard drive 84 and at temperatures in which the hard drive 84 would otherwise be inoperable.

The navigational device 212 of the second preferred embodiment may be portable and as such, may be a handheld device for use during hiking, running, or other physical activity, or the portable device 212 may be sized and configured for mounting on a dashboard or in an overhead console of a vehicle. Alternatively, the navigational device 212 may be any electronic device having the hard drive 84 and heating element 86 and as such, the navigational device 212 may not necessarily be portable. An even further alternative does not limit use of the hard drive 84 and proximate heating element 86 to a navigational device but rather calls for the hard drive 84 and heating element 86 for use in any electronic device.

As with the first preferred embodiment, the navigational device 212 broadly comprises a processor 216, a GPS receiver 218, an antenna 220, a memory 222, a data connector 226, a housing 228, a display 230, a light sensor 232, a speaker 234, a plurality of inputs 236, an internal power source 240, and a dead reckoning system 242, all of which are substantially similar to the corresponding elements disclosed in the first preferred embodiment. An example of a preferable navigational device 212 is the STREETPILOT 2620, manufactured and sold by Garmin International, Inc. of Olathe, Kans. As such, the above-listed elements will only be described to the extent necessary for understanding of the second preferred embodiment.

In addition to the above-listed elements, the navigational device 212 further includes the hard drive 84 and the heating element 86. The hard drive 84 may be in addition to a memory card slot 224, or alternatively, the navigational device may include only the hard drive 84 for storing cartographic data. Preferably, the navigational device 212 includes the memory 222 and the hard drive 84, such that the memory 222 is operable to store location or position data for short term use or data relating to past travel sessions. The hard drive 84 is then primarily used for storing cartographic data. During manufacture of the navigational device 212, at least some cartographic data that is commonly used is preferably stored on the hard drive 84. For example, highway information may always be stored on the hard drive 84. However, the hard drive 84 preferably has a sufficiently large storage capacity, such that a user may store additional cartographic information on the hard drive 84. Additionally, the hard drive 84 is preferably operable to be overwritten with new cartographic information as desired by the user.

As is well-known in the art, the hard drive 84 is comprised of at least one disk-shaped magnetized platters 88 stacked on top of each other, as illustrated in FIG. 5. The platters 88 are accessed by a plurality of read/write heads 90, each of which are attached to a head arm 92 and all of which are actuated by a head actuator 94. The read/write heads 90 are operable to read and write data to the platters 88. The head arm 92 supports each read/write head 90, such that the head 90 is positioned over the platter 88 by a minute layer of air when the platters 88 are spinning. The head arms 92 are moved around the platters 88 via the head actuator 94, which moves all heads 90 in unison.

Before use, each platter 88 must be formatted so as to divide the platter 88 into a plurality of sections (not shown) capable of receiving data. Each section is assigned an address. When the processor 216 is instructed to store data on the hard drive 84, the data is stored on a particular section at a known address. When the processor 216 is instructed to retrieve the stored data, the hard drive 84 spins the platters 88 to the appropriate section, and the read/write head 90 retrieves the data from the platter 88. Therefore, whenever data is stored/retrieved from the hard drive 84, the platters 88 of the hard drive 84 must physically spin to the assigned section for storage/retrieval of the data. Retrieved data is stored in the memory 222 for short-term use, as is well known in the art.

The hard drive 84 stored within the navigational device 212 of the second preferred embodiment preferably has one platter 88 and one read/write head 90, although the hard drive 84 may include more platters 88 and heads 90. Additionally, some single-platter hard drives 84 may include two read/write heads 90.

The hard drive 84 is preferably internal to the navigational device 212 and as such, is stored in the housing 228. Additionally, the hard drive 84 may be removable. Cartographic data may transmitted to the navigational device 212 and stored on the hard drive 84 via the data connector 226, which is preferably a USB connector or other connector operable to access a computer or other source of cartographic data. The data connector 226 may also employ wireless technology, such as the wireless technology manufactured and sold under the trademark BLUETOOTH.

As noted above, the navigational device 212 also includes the heating element 86, which may be coupled with the processor 216 or alternatively, may be independent of the processor 216. The heating element 86 is associated with the hard drive 84, such that the heating element 86 may be positioned proximate to, coupled with, or embedded within the hard drive 84. Alternatively, the heating element 86 may be associated with the hard drive 84, such that the heating element 86 is embedded within the housing 228 of the navigational device 210. The heating element 86 is then operable to warm the hard drive 84 to facilitate performance of the hard drive 84. As is well known, operation of the hard drive 84 is affected by the ambient temperature. In particular, the colder the ambient temperature, the greater the possibility of read/write errors and the potential for damage to the platter(s) 88. For example, "head on disk" occurrences may damage the platter(s) 88, such as when the read/write head(s) 90 is inadvertently positioned over the platter(s) 88 when the platter(s) 88 has not reached the proper operational speed. Another possibility for damage to the platter(s) 88 is when the read/write head(s) 90 cannot be retracted before the platter(s) 88 stops spinning. Therefore, cold temperatures may prevent the platter(s) 88 from ever attaining proper operational speed, thus preventing use of the hard drive 84. Alternatively, if the hard drive 84 is used when the platter(s) 88 is not operating at the proper speed, the platter(s) 88 may be permanently damaged, thus preventing the hard drive 84 from being used, even when the temperature returns to within normal operation parameters. These problems are particularly problematic when the navigational device 212 having the hard drive 84 is used outdoors in cold temperatures or in other cold locations.

To facilitate operation of the hard drive 84 and thus data storage/retrieval performance in cold temperatures, the heating element 86 warms the hard drive 84 without adversely affecting the other components positioned within the housing 228 of the navigational device 212. Preferably, the heating element 86 is a plurality of discrete resistors 87 arranged in a distributed pattern on a printed circuit board ("PCB") 89 that is positioned proximate to the hard drive 84, as illustrated in FIG. 5. However, as can be appreciated, a variety of heating elements 86 may be used to warm the hard drive 84, and the type of heating element 86 used may be dependent on whether the heating element 86 is positioned proximate to the hard drive 84 or embedded within the hard drive 84. Preferably, however, the heating element 86 is sized to fit within the housing 228. Although not inclusive, example heating elements 86 may use thermotunneling technology with respect to the flow of electrons or may use electroresistive technology, such as the plurality of discrete resistors 87 described above.

The navigational device 212 further includes a temperature sensor 96 operable to determine a temperature associated with the hard drive 84. The temperature sensor 96 may be coupled with or internal to the hard drive 84 and operable to determine an approximate temperature of the hard drive 84 directly, or the temperature sensor 96 may be coupled with the processor 216 and operable to determine an approximate temperature of the hard drive 84 indirectly by determining a temperature of the navigational device 212. An even further alternative provides for the temperature sensor 96 to be coupled directly with the heating element 86 and independent of the processor 216.

Preferably, operation of the heating element 86 is dependent on the sensed temperature of the navigational device 212 and therefore, is not in constant operation. The heating element 86 and hard drive 84 are preferably powered independent of each other, such that the heating element 86 may be powered to initially warm the hard drive 84 before the hard drive 84 is provided with power. Before operation of either the heating element 86 or the hard drive 84, the temperature sensor 96 preferably determines a temperature of the navigational device 212, although as discussed above, the temperature sensor 96 may alternatively determine a temperature of the hard drive 84 directly. Therefore, it is to be understood that the temperature sensor 96 determines a temperature associated with the hard drive 84, although a process for heating the hard drive 84 will be described below with respect to the temperature of the navigational device 212.

The following state machine process is dependent on the temperature of the navigational device 212 and an elapsed operation time for the heating element 86. As such, a heater timer 98 is electronically coupled with the processor 216 for determining an elapsed operation time of the heating element 86. The following is a summary of the decision process for determining when to power the heating element 86 for warming the hard drive 84. The terms and associated definitions are outlined as follows:

NDIT=Navigational Device's Internal Temperature
HD_LTL=Hard Drive's Low Temperature Limit
TMR_HTL=Timer High Temperature Limit
TMR_LTL=Timer Low Temperature Limit
HTMR=Time of Operation of the Heater Timer
K_TMR=Scaling Constant
HTMR_MIN=Minimum Value for HTMR The NDIT is the navigational device's 212 internal temperature as sensed by the temperature sensor 96.

The HD_LTL is the minimum or low operating temperature for the hard drive 84. For any temperature below the HD_LTL, the hard drive 84 will not be allowed to operate.

The TMR_HTL is the maximum or high temperature at which the heating element 86 will no longer be required. Note that the HD_LTL and the TMR_HTL are substantially the same temperature under most operating conditions.

The TMR_LTL is the minimum or low temperature at which the heater timer 98 will be required to monitor the time of operation of the heating element 86. For any temperature below the TMR_LTL, the heating element 86 will operate to warm the hard drive 84 without using the heater timer 98 to monitor an amount of time the heating element 86 is operating.

The HTMR is the time of operation of the heater timer 98. The heater timer 98 controls the operating time of the heating element 86. The time for operating the heating element 86 as controlled by the heater timer 98 is the time necessary to obtain a sufficiently warm hard drive 84, which is determined by the following equation:

$$HTMR = K\_TMR \approx (NDIT - HD\_LTL) + HTMR\_MIN$$

The K_TMR is the scaling constant in the above linear equation. The scaling constant determines how long the operating time of the heater timer 98, i.e., HTMR, varies relative to the temperature changes. For example, if K_TMR is larger, then HTMR changes more for a given temperature change.

The HTMR_MIN is the minimum operating time for the heater timer 98. The minimum value, i.e., HTMR_MIN, is the least amount of time that the heater timer 98 must run to sufficiently warm the hard drive 84.

The possible initial operating conditions are as follows:

(1) If the NDIT is initially below the TMR_LTL when the navigational device 212 is powered on, then the heating element 86 is powered on, but the heater timer 98 is not. While the NDIT is less than the TMR_LTL, the hard drive 84 cannot be accessed and power is stopped to the drive 84. When the NDIT rises above the TMR_LTL, the heater timer 98 is started. The value of the HTMR, i.e., the operating time of the heating element 86, is calculated using the above equation. After the HTMR has run, i.e., after the elapsed time has run, the hard drive 84 may be accessed.

(2) If the TMR_LTL<NDIT<TMR_HTL when the navigational device 212 is initially powered on, then the heating element 86 is powered on and the heater timer 98 is set according to the above equation. While the heater timer 98 is running, the hard drive 84 may not be accessed and power is stopped to the hard drive 84. After the elapsed time on the heater timer 98 has run, the hard drive 84 may be accessed.

(3) If the NDIT is initially greater than to HD_LTL but then drops below the HD_LTL while the navigational device 212 is operating, then the heating element 86 is powered on. The hard drive 84 may be accessed while the NDIT is greater than the TMR_LTL. If the NDIT drops below the TMR_LTL, then the heating element 86 remains powered on, but the hard drive 84 may not be accessed and power is stopped to the hard drive 84.

In an alternative implementation of the second preferred embodiment, a motor 85 of the hard drive 84 may be used to heat the hard drive 84. In particular, the hard drive 84 is preferably operable to spin the platter(s) 88 without attempting to move the read/write head(s) 90 out over the platter(s) 88. The spinning of the motor 85 operates to warm the hard drive 84 to the necessary operating temperature. The processor 216 of the navigational device 212 is preferably operable to instruct the motor 85 to spin the platter(s) 88 without actually accessing the information on the platter(s) 88. As with operation of the heating element 86 described above, the possible initial operating conditions are as described below:

(1) If the NDIT is below the TMR_LTL when the navigational device 212 is initially powered on, then power is not supplied to the hard drive 84 and the hard drive 84 may not be accessed. While the NDIT is less than the TMR_LTL, the hard drive 84 remains unpowered and no access is allowed. When the NDIT rises above the TMR_LTL, power is supplied to the hard drive 84, and the hard drive 84 is configured to spin continuously. The heater timer 98 is started and is instructed to operate for an elapsed time determined by the above equation. While the heater timer 98 is running, the hard drive 84 spins, but information on the platter(s) 88 may not be accessed, i.e., the read/write head(s) 90 remains parked. After the elapsed time on the heater timer 98 has run, the hard drive 84 may be accessed.

(2) If the TMR_LTL<NDIT<TMR_HTL when the navigational device 212 is initially powered on, then the hard drive 84 is powered on and instructed to spin continuously. The heater timer 98 is instructed to operate for an elapsed time determined by the above equation. While the heater timer 98 is running, the hard drive 84 spins, but information on the platter(s) 88 may not be accessed. After the elapsed time on the heater timer 98 has run, the hard drive 84 may be accessed.

(3) If the NDIT is initially greater than the HD_LTL but then drops below the HD_LTL while the navigational device 212 is operating, the hard drive 84 is instructed to spin continuously. The hard drive 84 may be accessed while the NDIT is greater than the TMR_LTL. If the NDIT drops below the TMR_LTL, then power to the hard drive 84 is stopped and the hard drive 84 may not be accessed.

Note that the above temperature decision points may be affected by hysteresis. Therefore, although no exact temperature values are provided, any decision point values used are approximate only.

In an even further alternative implementation, the heating element 86 may operate to warm the hard drive 84 when the hard drive 84 (or navigational device 212) reaches a predetermined minimum value as measured by the temperature sensor 96. The processor 216 may then instruct the heating element 86 to warm the hard drive 84. Alternatively, the heating element 86 may operate at all times when the navigational device 212 is in operation, including when use of the heating element 86 is not necessarily required due to the warmth of the ambient air around the hard drive 84.

The heater timer 98 described above is preferably not required if the temperature sensor 96 is internal to the hard drive 84. For example, if the temperature sensor 96 is internal to the hard drive 84, the temperature of the hard drive 84 may be read directly from the temperature sensor 96, and the heating element 86 that warms the hard drive 84 may be controlled based on the sensed temperature from the internal temperature sensor 96.

A third preferred embodiment of the present invention provides a navigation system 310 comprising a navigational device 312 and a remote control 314 substantially similar to the navigational device 12 and remote control 14 of the first preferred embodiment, except that the navigational device 312 further includes an internal hard drive 384 and a heating element 386 substantially similar to the internal hard drive 84 and heating element 86 of the second preferred embodiment. The navigational device 312 includes a processor 316, a GPS receiver 318, an antenna 320, a memory 322, a memory card slot 324, a data connector 326, a housing 328, a display 330, a light sensor 332, a speaker 334, a plurality of inputs 336, an infrared receiver 338, a power source 340, a dead reckoning system, 342, a temperature sensor 396, and a heater timer 398. The remote control 14 includes an infrared transmitter 370, a processor 372, an input 374, a power source 378, and a housing 380.

As in the second preferred embodiment, the hard drive 384 is operable to store cartographic data or other navigation-related data. The heating element 386 is coupled with, positioned proximate to, or embedded within the hard drive 384 and operable to warm the hard drive 384 to facilitate operating performance of the hard drive 384 in cold temperatures. The remote control 314 is operable to remotely control the portable navigational device 312 when the navigational device 312 is mounted on a dashboard or in an overhead console of a vehicle.

Although the invention has been described with reference to the preferred embodiment illustrated in the attached drawing figures, it is noted that equivalents may be employed and substitutions made herein without departing from the scope of the invention as recited in the claims. For example, the remote 14 of the first preferred embodiment may be incorporated or embedded within another electronic device, such as a personal digital assistant ("PDA"). The PDA would then function as the remote 14 and include the infrared transmitter 70 operable to transmit signals to the navigational device 12.

In the second preferred embodiment, the hard drive 84 and heating element 86 may be used with any electronic device that need not necessarily be operable to determine the location or position of the user. Additionally, although the navigational device 212 of the second preferred embodiment is portable, the hard drive 84 and heating element 86 may be used with any sized navigational device.

Other types of rotating storage media may be used as memory instead of the hard drive 84 described in the second preferred embodiment. For example, instead of the hard drive 84, CD-ROMs or DVD-ROMs/RAMs may be used to store cartographic information or other navigation-related information. Therefore, the second preferred embodiment may provide for heating of any internal memory comprising a rotating medium.

The navigational device 212 of the second preferred embodiment may also be operable to prevent the hard drive 84 from operating at extreme hot temperatures to avoid damage to the hard drive 84. When the hard drive 84 is too warm for safe operation, the processor 216 instructs the hard drive 84 not to spin, and a message stating that the hard drive 84 temperature is too high is preferably shown on the display 230.

Having thus described the preferred embodiment of the invention, what is claimed as new and desired to be protected by Letters Patent includes the following:

1. A navigation system comprising:
   a global positioning system ("GPS") receiver for receiving satellite signals from a plurality of satellites,
   an antenna coupled with the GPS receiver for facilitating receipt of the satellite signals by the GPS receiver,
   a processor coupled with the GPS receiver for calculating a location of the GPS unit as a function of the satellite signals,
   a data storage coupled with processor and operable to store cartographic data, and
   a portable housing for storing the processor and the data storage; and
   a heating mechanism within the housing and operable to warm the data storage.

2. The navigation system as claimed in claim 1, wherein the housing is sized and configured to mount on a dashboard of a vehicle.

3. The navigation system as claimed in claim 1, wherein the housing is sized and configured to mount within an overhead console of a vehicle.

4. The navigation system as claimed in claim 1, further including a display mounted to the housing.

5. The navigation system as claimed in claim 1, wherein the housing further houses the GPS receiver.

6. The navigation system as claimed in claim 5, wherein the housing further houses the antenna.

7. The navigation system as claimed in claim 1, wherein the data storage is a hard drive and the heating mechanism comprises a motor associated with the hard drive, such that heat is generated by spinning the motor while keeping the hard drive's heads parked.

8. The navigation system as claimed in claim 1, wherein the heating mechanism comprises a heating element.

9. The navigation system as claimed in claim 1, wherein the heating mechanism is configured to heat the data storage rather than the processor.

10. A portable electronic device comprising:
    a processor for controlling operation of the electronic device;
    a data storage electronically coupled with the processor and operable to store data;
    a temperature sensor operable to sense a temperature associated with the data storage;
    a heating element configured to warm the data storage, wherein the processor controls the heating element according to the sensor; and
    a portable housing for storing the processor, data storage, sensor, and heating element.

11. The electronic device as claimed in claim 10, wherein the housing further houses a GPS receiver and an antenna.

* * * * *